US008832056B2

(12) United States Patent
Smyth et al.

(10) Patent No.: US 8,832,056 B2
(45) Date of Patent: Sep. 9, 2014

(54) CONTENT INSERTION ELEMENTS TO COMBINE SEARCH RESULTS

(75) Inventors: Samuel Gavin Smyth, Cambridge (GB); Michael J. Taylor, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 13/091,594

(22) Filed: Apr. 21, 2011

(65) Prior Publication Data

US 2012/0271807 A1    Oct. 25, 2012

(51) Int. Cl.
*G06F 17/30*    (2006.01)

(52) U.S. Cl.
CPC ............................. *G06F 17/30864* (2013.01)
USPC .......................................... 707/706; 707/722

(58) Field of Classification Search
None
See application file for complete search history.

(56) References Cited

U.S. PATENT DOCUMENTS

| | | | |
|---|---|---|---|
| 7,774,251 B1 | 8/2010 | Prasad et al. | |
| 7,836,041 B1* | 11/2010 | Jain et al. | 707/706 |
| 2001/0003813 A1* | 6/2001 | Sugano et al. | 704/500 |
| 2006/0155685 A1 | 7/2006 | Grim, III et al. | |
| 2008/0033971 A1* | 2/2008 | Carmel et al. | 707/101 |
| 2008/0072180 A1* | 3/2008 | Chevalier et al. | 715/861 |
| 2008/0222122 A1 | 9/2008 | Morita | |
| 2008/0294716 A1 | 11/2008 | Couvreur | |
| 2009/0094525 A1* | 4/2009 | Coelius et al. | 715/741 |
| 2009/0225674 A1* | 9/2009 | Kim et al. | 370/252 |
| 2009/0299862 A1 | 12/2009 | Fan et al. | |
| 2009/0300496 A1 | 12/2009 | Fan et al. | |
| 2009/0327869 A1 | 12/2009 | Fan et al. | |
| 2010/0058293 A1 | 3/2010 | Dunagan et al. | |
| 2010/0100725 A1 | 4/2010 | Ozzie et al. | |
| 2010/0174709 A1* | 7/2010 | Hansen et al. | 707/728 |
| 2010/0251095 A1* | 9/2010 | Juvet et al. | 715/234 |

OTHER PUBLICATIONS

Bingham, "Integrate Windows Desktop Search 2.x with Web Search", retrieved on Dec. 2, 2010 at <<http://www.codeproject.com/KB/cs/WdsIntegration.aspx>>, The Code Project, Dec. 3 2006, pp. 1-4.

"Google's Business Search_Internet News: Enterprise Search Archives", retrieved on Dec. 3, 2010 at <<http://www.websearchguide.ca/netblog/archives/cat_enterprise_search.html>>, May 26, 2005, pp. 1-23.

"Searching for the Desktop", retrieved on Nov. 30, 2010 at <<http://www.consumerelectronicsnet.com/articles/viewarticle.jsp?id=1261485>>, Studio One Networks, Nov. 2010, pp. 1-6.

(Continued)

*Primary Examiner* — Son T Hoang
(74) *Attorney, Agent, or Firm* — Pablo Tapia; Jim Ross; Micky Minhas (57) ABSTRACT

Content insertion elements to combine search results, for example, enable a user to search the internet and obtain relevant intranet search results integrated into the results page from the internet source. In embodiments enterprise search results, desktop search results, or paid for search results are combined with internet search results. For example, a public internet search engine maintains mapping data indicating which users or user computers are authorized to access content from a second source. In an embodiment, an internet search engine receives a query from a web browser and returns results together with a content insertion element only if mapping data requirements are met. A content insertion element may hold an address of a second content source, a query and optional parameters. A web browser is able to render a web page displaying results from more than one content source using the content insertion element.

20 Claims, 7 Drawing Sheets

(56) References Cited

OTHER PUBLICATIONS

"Server Name Mapping and Alternate Access Mapping (AAM)", retrieved on Dec. 1, 2010 at <<http://blogs.msdn.com/b/enterprisesearch/archive/2010/05/28/server-name-mapping-and-alternate-access-mapping-aam.aspx>>, Microsoft Corporation, May 28, 2010, pp. 1.

"WebTerm, Terminology management—world-wide", retrieved on Nov. 30, 2010 at <<http://www.star-group.net/downloads/DEU/pg_webterm_eng.pdf>>, Star Group, Product Guide, Nov. 2010, pp. 1-14.

* cited by examiner

FIG. 7

CONTENT INSERTION ELEMENTS TO COMBINE SEARCH RESULTS

BACKGROUND

Combining search results from different sources such as internet and intranet search engines is an ongoing field of development. In many situations it is useful to have search results from several sources in view at the same time. For example, results from "paid for" web services, results from public archives, results from enterprises, results from a user's home network, results from social network services, results from content sources of different types.

Some existing approaches to combining search results from different sources merely show results from different sources in different parts of a results page. This minimal combination mechanism may be implemented without needing a server to combine the results. Other approaches use a merging server or other entity to combine the search results. Search requests are channeled through the merging server to different sources. The merging server may then receive results from the different sources and de-duplicate and merge the results before enabling them to be output to a user.

The embodiments described below are not limited to implementations which solve any or all of the disadvantages of known systems for combining search results.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Content insertion elements to combine search results are described, for example, to enable a user to search the internet and obtain relevant intranet search results integrated into the results page from the internet source. In embodiments enterprise search results, desktop search results, or paid for search results are combined with internet search results. For example, a public internet search engine maintains mapping data indicating which users or user computers are authorized to access content from a second source. In an embodiment, an internet search engine receives a query from a web browser and returns results together with a content insertion element only if mapping data requirements are met. A content insertion element may hold an address of a second content source, a query and optional parameters. A web browser is able to render a web page displaying results from more than one content source using the content insertion element.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for combining internet and intranet search results, the system described is provided as an example and not a limitation. As those skilled in the art will appreciate, the present examples are suitable for application in a variety of different types of systems for combining search results.

Figure 1:
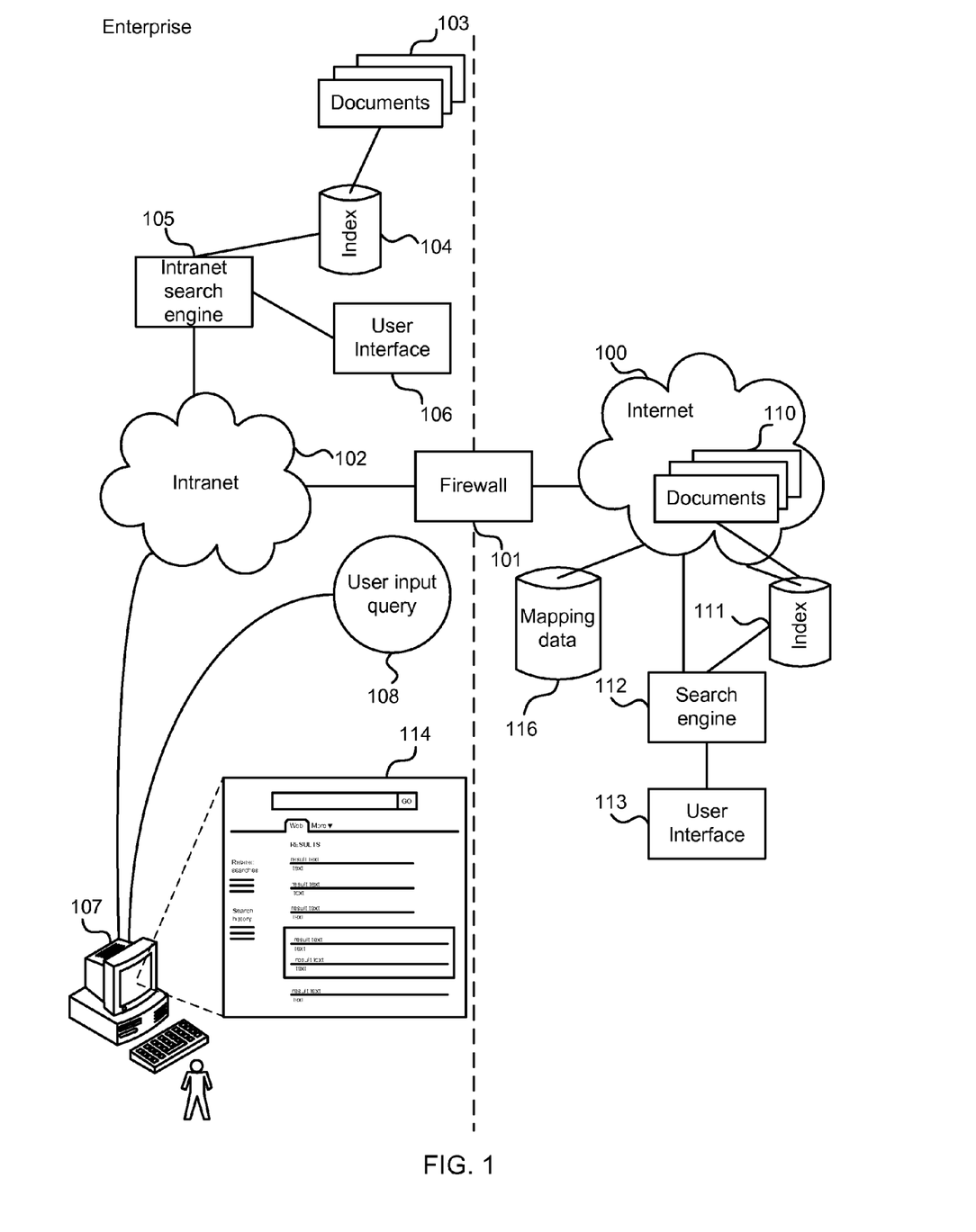
FIG. 1 is a schematic diagram of an enterprise network connected via a firewall to a public domain network and where a client terminal in the enterprise network is able to show combined search results.

FIG. 1 is a schematic diagram of an information retrieval system at an Enterprise (or other private domain) connected behind a firewall 101 to the Internet 100. The entities to the left of the dotted line in FIG. 1 are referred to herein as being part of the Enterprise domain whereas those to the right of the dotted line are in the public domain. A search engine 112 is provided in the public domain connected to the Internet 100 and arranged to provide a user interface 113 which can be browsed by an end user at a client terminal such as client terminal 107 in the Enterprise domain. The client terminal may be a personal computer, a laptop computer, a mobile telephone, a personal digital assistant, or any other client device which is able to provide web browsing functionality. The search engine 112 has access to an index 111 of documents 110. It is arranged to receive query terms 108 from an end user at a client terminal 107 (either in the public or private domain) and to return a ranked list of documents using the index 111 as known in the art. The ranked list of documents may be displayed at a user display 114. The search engine has access to mapping data 116 which may be stored at the search engine itself or may be at another location in communication with the search engine. The mapping data is described in more detail below. In embodiments described herein search results from another search engine such as intranet search engine 105 may be included with the display if criteria are met. This is achieved without the need for a merging engine.

An intranet search engine 105 is also provided in the Enterprise domain and connected to an intranet 102 to which the client terminal 107 is also connected. The intranet search engine 105 has access to an index 104 of documents 103 which are available to users in the Enterprise but which are not generally available outside the Enterprise domain. For example, an intranet for educational organizations may have free access to premium content that is not available on the public internet. Also, an intranet for a national healthcare provider may have access to confidential and/or otherwise expensive information which is not available publicly. In another example, a group of users may have access to a private social networking site with information that is not available publicly. In this case the documents 103 and index 104 in FIG. 1 represent at least some information which is not generally available publicly. The intranet search engine 105 also provides a user interface 106 which is accessible by the client terminal 107. An end user at the client terminal 107 is able to input user query terms 108 to the Intranet search engine user interface 106 to obtain a ranked list of documents from the index 104. In this way the end user is able to manually send queries to either the internet search engine 112 or the intranet search engine 105. However, the end user often does not know from which source they are likely to find the best results. A time consuming process of trial and error often results whereby the end user sends a query to the internet search engine (for example) and reviews the results before sending the same query to the intranet search engine.

Another difference between the intranet search engine 105 and the public internet search engine 112 in FIG. 1 is that the intranet search engine 105 may have access to private user information about users of the intranet which is not available to the public internet search engine 112. For example, this information may be demographic information and/or may comprise confidential details such as the age of the user, the role of the user in the Enterprise (e.g. nurse, doctor, pupil, teacher, manager, support staff), the office location of the user and other such details.

In other examples there is no firewall 101. For example, one of the search engines may access content which is publicly available and the other search engine may access content in a controlled manner, such as paid for content or content that is only available to authorized users.

In other examples there are more than two search engines. For example, there may be two or more public domain search engines which have access to different types of content or two or more search engines where access to content is controlled.

In an example, a user at client terminal 107 is able to input a query 108 at a web browser provided at the client terminal. For example, the query may be one or more keywords, images, or parts of words or images. The web browser is associated with an identifier. For example, the identifier may be an internet protocol address of the client terminal 107, a user identifier, an identifier of the client terminal such as a SIM (subscriber identification module) or other identifier which is able to identify the client terminal.

The web browser sends the query to a first one of the search engines, such as the internet search engine 112. The web browser may also send the identifier together with the query to the first search engine. That search engine has access to mapping data 116 as mentioned above. The mapping data is used to filter queries received at the search engine on the basis of the identifiers. For example, the filtering may be on the basis of an internet protocol (IP) address in order to select only those queries from web browsers which are in the enterprise (or other specified) domain. The filtering may be on the basis of user ID to select only those users who have paid for access to the intranet search engine 105 or other second search engine. In other examples filtering is on the basis of client device type and/or web browser type.

When a query passes the filtering stage, the first search engine generates at least one content insertion element holding at least the query and an address of a second search engine. Optionally other parameters may be included in the content insertion element as described in more detail later.

The content insertion element may be an iframe or other hyper text mark up language (HTML) element. In some examples the content insertion element comprises multi-media platform instructions or rich internet application framework instructions such as Adobe Flash (trade mark) instructions or Silverlight® instructions. The query is presented to the first search engine to retrieve results and those are sent to the web browser together with the content insertion element. The web browser is able to render a results page 114 comprising at least some of the first search engine search results and second search engine search results. This is because the content insertion element is executed by the web browser which causes the web browser to send a query to the intranet search engine 105 and display retrieved results in the iframe or other hyper text mark up element at display 114. The content insertion element can be thought of as injecting intranet content into the search results page from the internet search engine. In some examples more than one content insertion element is used.

Figure 2:
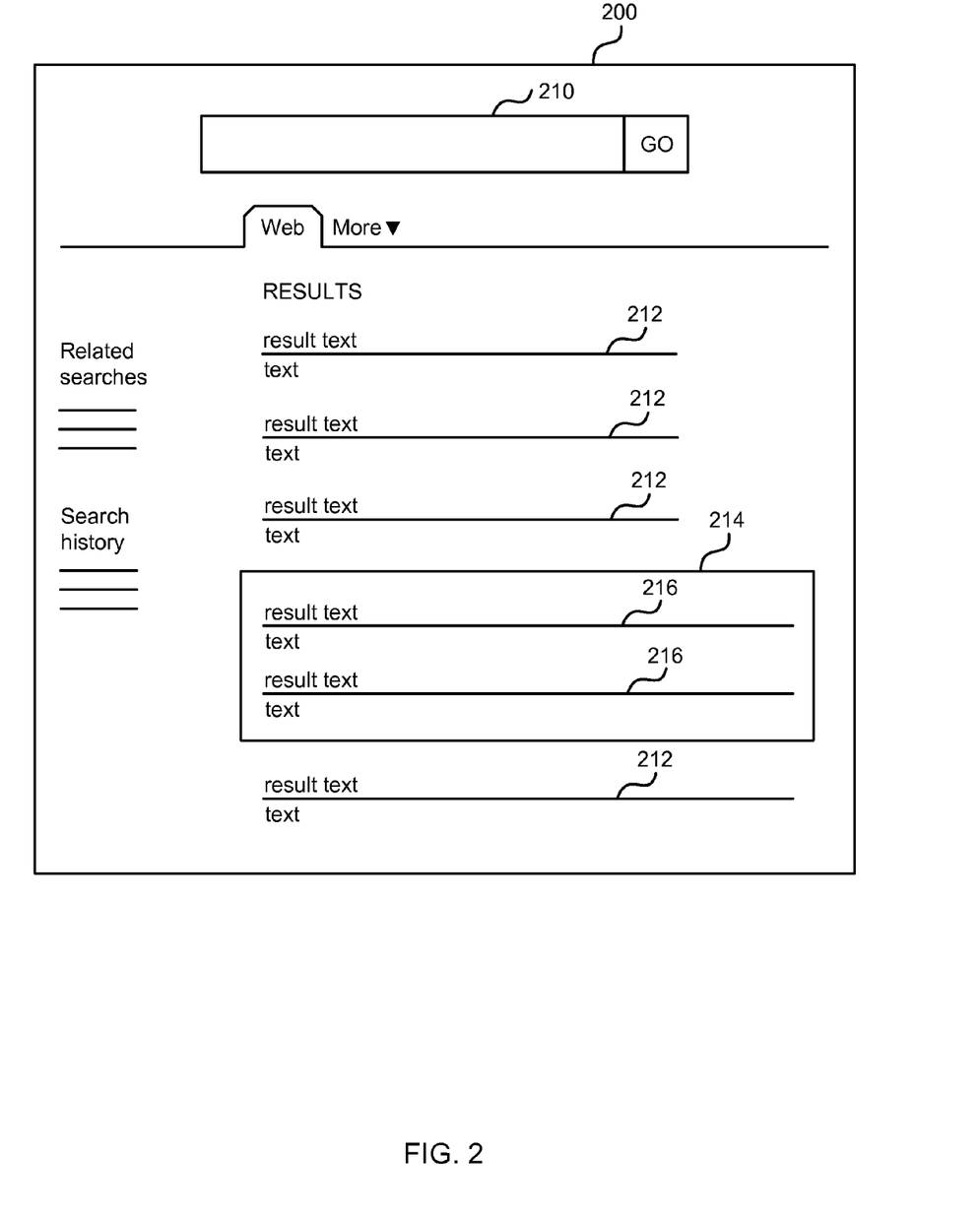
FIG. 2 is a schematic diagram of a web browser displaying combined search results using a content insertion element.

FIG. 2 is a schematic diagram of a web browser 200 displaying combined search results using a content insertion element 214. A query entry field 210 is provided to enable a user to enter a query. Retrieved search results 212 are displayed in a ranked list. For example, these are search results 212 from an internet search engine. A content insertion element 214 is represented as a rectangular region containing search results 216 from a second search engine. In some examples the content insertion element 214 is marked on the display using a boarder, shading, color or the like. This provides a visual indication to the user that the results 216 are from a different source that the results 212. However, this is not essential, the content insertion element 214 maybe transparent to the user. In this example a single content insertion element is shown. However, it is possible for two or more content insertion elements to be used. Also, the position and size of the content insertion elements may vary as described in more detail below. For example, if the intranet search is unsuccessful the content insertion element may have zero height so that it is not visible at the display. In another example, the content insertion element may be made invisible or transparent to the user by appropriate style properties.

Figure 3:
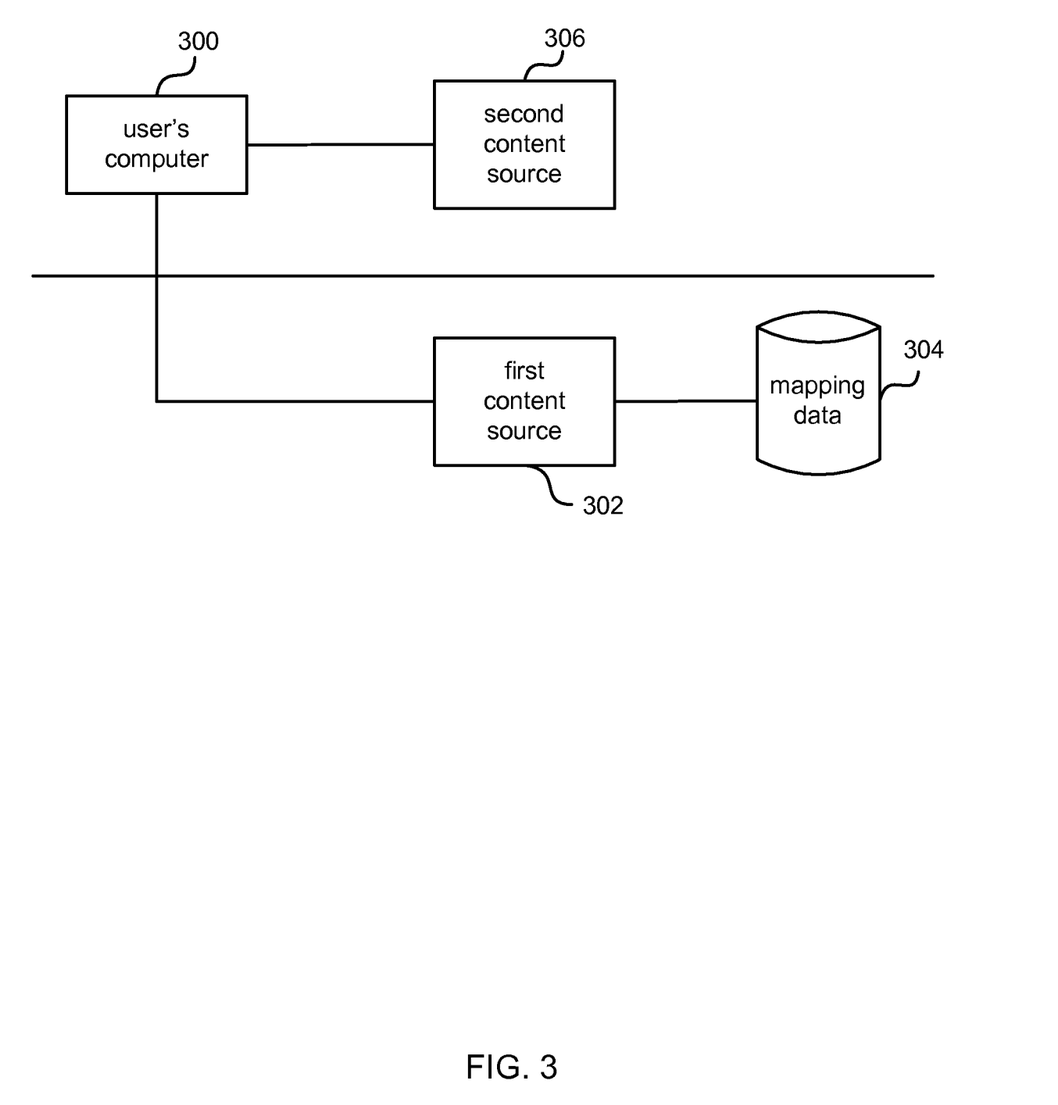
FIG. 3 is a schematic diagram of a system for combining search results.

FIG. 3 is a schematic diagram of a system for combining search results. A user's computer 300 is provided which may be a personal computer, a laptop computer, a mobile telephone or any computing device which has a web browser and is able to access web-based content over a communications network. The user's computer 300 is in communication with a first content source 302 over a communications network of any suitable type. The first content source may be for example, a search engine, a web service which provides content, a database, or any other source of content. The first content source has access to mapping data 304 which may be stored at the first content source, or at another location accessible to the first content source. The mapping data may be used as filter to assess whether the user or the user's computer 300 is able to access one or more second content sources 306. The example in FIG. 3 shows one second content source 306 connected to the user's computer 300 using a communications link.

In an example the second content source is located in an enterprise network and the user's computer 300 is also in the enterprise network. The first content source 302 may be external to the enterprise network. The horizontal line in FIG. 3 may represent a boundary between an enterprise network and a public network. This arrangement is similar to that of FIG. 1. When a user operates a web browser at the user's computer 300 to access the first content source 302, the mapping data 304 may be used to check whether the user's computer (or user) is listed as being authorized to access the second content source 306. If so, the first content source returns a content insertion element to the user's computer 300 together with any content retrieved from the first content source 302. The web browser at the user's computer 300 renders the content retrieved from the first content source together with the content insertion element on a single web page display. The content insertion element causes the web browser to retrieve content from the second content source 306 and insert that into the same web page as the content retrieved from the first content source.

This type of arrangement may reduce content retrieval latency and network congestion as compared with other approaches which use a merging server or similar arrangements. There is no need to route all the retrieved content through a single entity before sending that to the user's computer 300. This reduces load on the network. Also, where this type of arrangement is used the merged results may be provided as a single coherent web search results page. This is user friendly and intuitive for the users. When the user's computer 300 is mobile and can be connected on and off the enterprise network and internet, the user does not need to change any addresses used for accessing content. In contrast, previous systems using merging servers typically require a user to select an address of an appropriate content source to use according to which type of communications network the user's computer 300 is connected to.

The horizontal line in FIG. 3 is optional. In cases where this line is omitted the first and second content sources may be in the same communications network domain for example. The first content source may be a publicly accessible internet search engine and the second content source may be a limited access content source such as a paid for service. The mapping data 304 comprises information about which user's or user's computers 300 have access to the limited access content source. The mapping data may change over time and may comprise rules such as limiting the number of computers able to access the second content source at any one time, or limiting the time of day that the second content source may be accessed by particular entities. In some cases the mapping data is provided using a look up table so that for example, ranges of IP addresses of user computers 300 which have access to the second content source may be checked in a scalable manner. However, it is not essential to use a look up table. Other data structures may be used.

Figure 4:
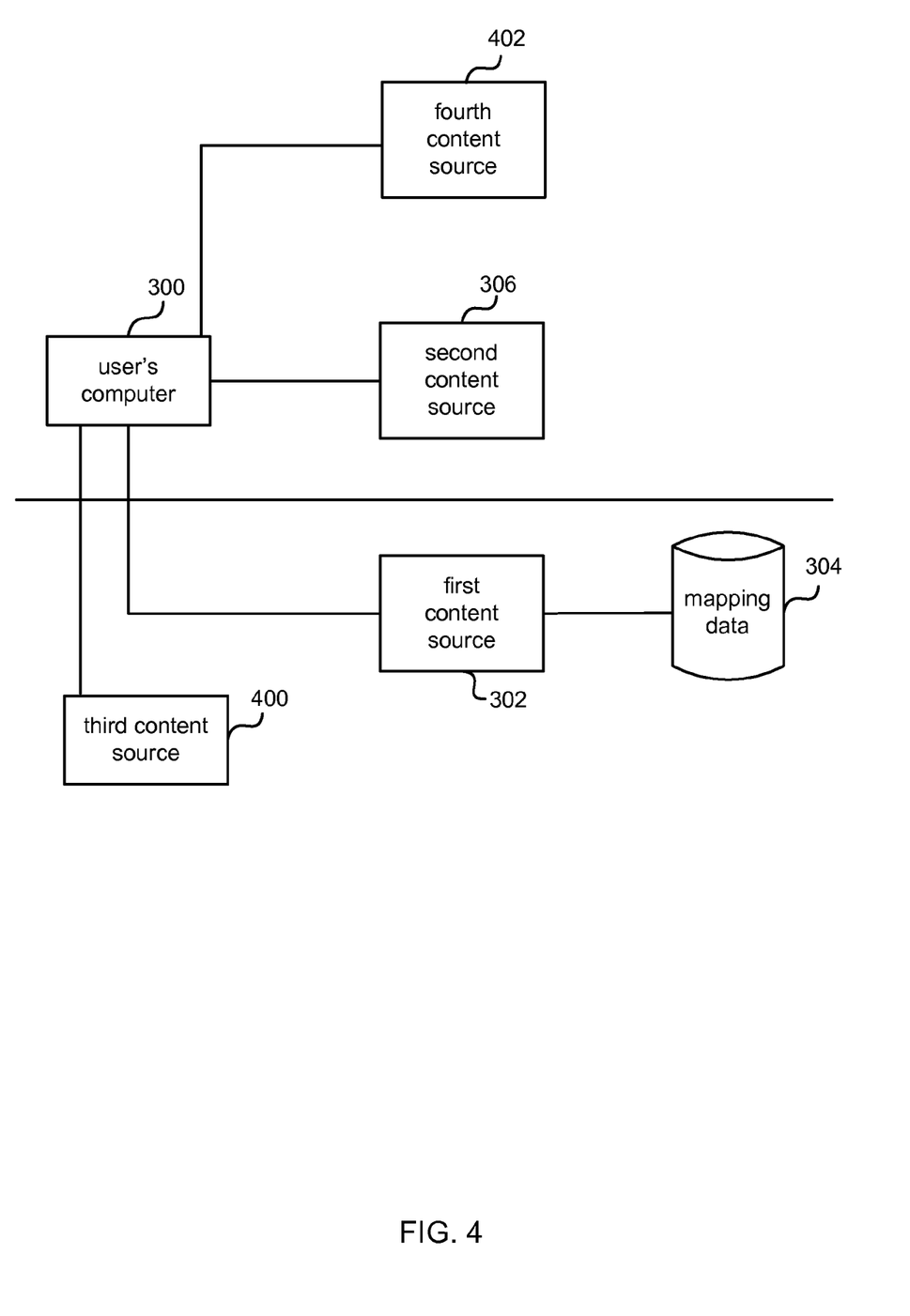
FIG. 4 is a schematic diagram of another system for combining search results.

Search results from more than two content sources may be combined. For example, FIG. 4 is a schematic diagram of the communications network of FIG. 3 with a third and a fourth content source added. For example, the third content source 400 may be a publicly available database which is accessible by users on a paid for basis. The mapping data 304 comprises information about which users have a subscription to that third content source 400. The fourth content source 402 may be located in the enterprise domain and comprise different content from the second content source 306. For example, the fourth content source 402 may comprise accounts data available to finance department staff. The mapping data 304 may comprise information about which users or user computers 300 are authorized to access the fourth content source. A user at the user's computer 300 is able to issue a single query to the first content source 302 and retrieve a single web page of results that comprises results from the second, third and fourth content sources, provided the user is authorized to do so according to the mapping data 304. This is an easy to use, intuitive system which avoids the need for a merging server or other entity through which all results are channeled.

Figure 5:
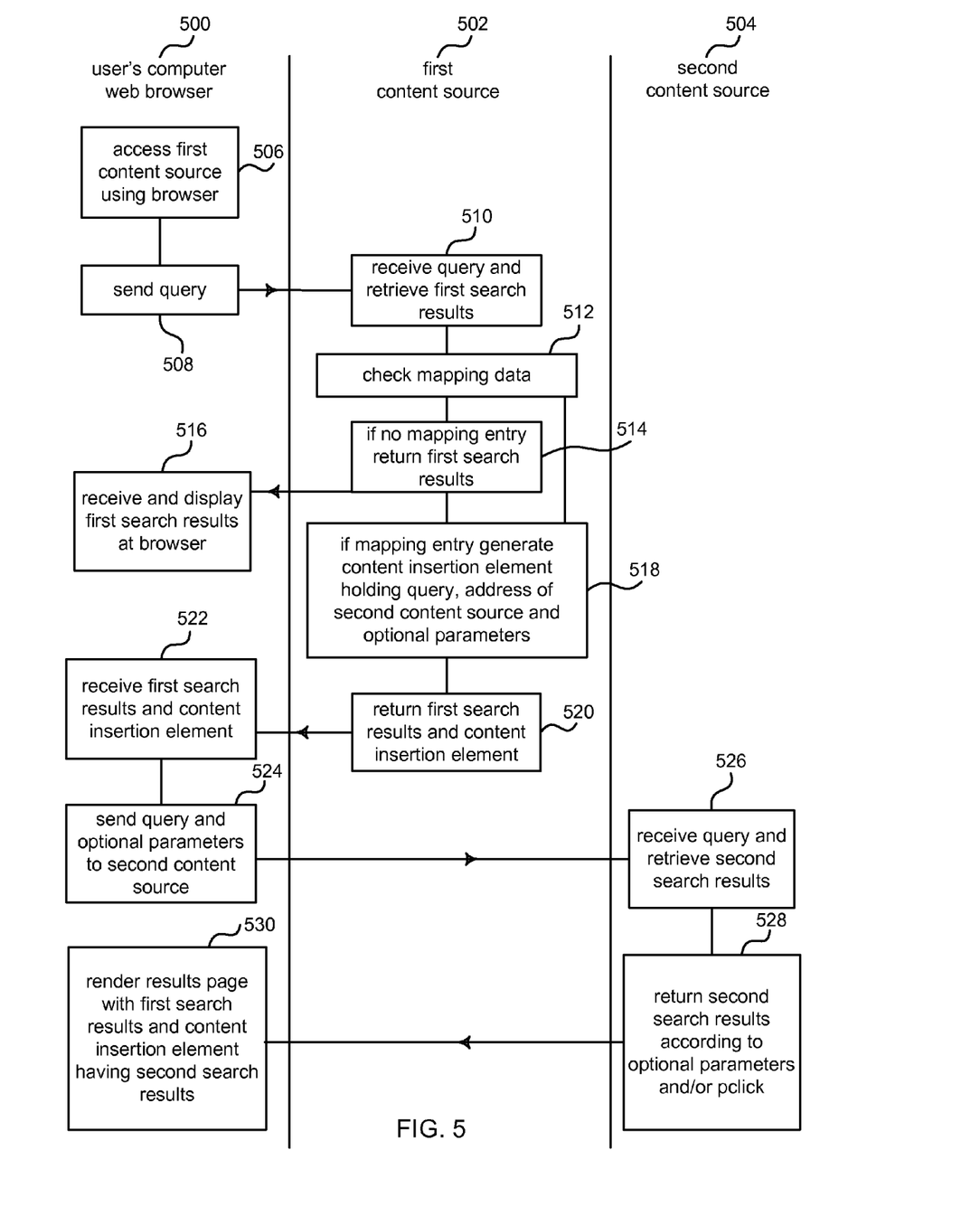
FIG. 5 is a flow diagram of an example method of combining search results.

FIG. 5 is a flow diagram of example methods at each of a user's computer web browser 500, a first content source 502 and a second content source 504. Method steps at the user's computer web browser 500 are illustrated in a column on the left hand side of the page, method steps at the first content source 502 at a column in the center of the page and method steps at the second content source in a column on the right hand side of the page. The web browser 500 and first and second content sources are in communication with one another using a communications network, for example, as illustrated in FIG. 3.

The web browser 506 receives user input causing it to access 506 the first content source. For example, a web-based search interface to a search engine of the first content source is displayed at the web browser. A query is input by a user and the web browser 500 sends 508 the query to the first content source. The query may be one or more key words, a phrase, a string, an image, a document such as an email, blog entry, short text message, part of a document or any other query. Each query is associated with an identifier which identifies for example the source of the query. In some embodiments the identifier may be an address of the web browser at the client device such as an internet protocol address. The identifier may be a user ID which indicates whether a user has paid for access to particular content. The identifier may be an indicator of the client device type or web browser type. The identifier may be a combination of one or more different types of identifier.

The first content source 502 receives the query and retrieves 510 first search results from itself. For example, the search results comprise a ranked list of documents optionally with a probability of click associated with each document. The search results are retrieved in any suitable manner.

The first content source may receive many such queries from different web browsers at any given time. The identifiers associated with the queries are filtered or checked 512 against an access criterion. The access criterion may be stored in the form of mapping data 512 and used to find those queries which are to be used to combine content from two or more sources. Note that retrieving the first search results at step 510 may happen at the same time as the checking of the mapping data 512; or the mapping data may be checked before the first search results are retrieved. The order in which the first search results are retrieved and the mapping data is checked may vary.

For a given query, if no mapping entry is found the first content source returns 514 the first search results to the web browser 500. The web browser 500 receives and displays 516 the first search results. If a mapping entry is found the first content source generates 502 a content insertion element. The content insertion element holds the query, an address of a second content source 504 and optional parameters. The optional parameters may comprise data about the user, data about the web browser 500, data about the first search results (such as how many first search results there are), or other information.

In some embodiments the first content source 502 may modify the query by adding key words or in other ways. For example, optional parameters in the content insertion element may be used to modify the query. In an example, the optional parameters comprise user data such as information about the geographical location or language preferences of the user. These may be used to modify the query by adding key words which seek to bias the query towards obtaining results tailored to the language preferences of the user.

In an example the content insertion element is an iframe where a source of the iframe is a universal resource locator (URL) of the second content source together with the query and optional parameters. For example, an iframe with a source of the following form may be used:

```
<iframe src=http://msw/shortresults.aspx?q=query&instant=0 height="0"></iframe>
```

In this example the query is the key word "query" and the optional parameters include whether a facility called instant answers is present or not at the results page of the first content source 502. A height of the iframe is set at zero at this stage so that the iframe is initially invisible on the results page of the first content source.

However, it is not essential to use an iframe for the content insertion element. It is also possible to use an HTML div or other element type. The content insertion element may be any instruction which enables a web browser to render a web page and access content from another source and render that content as part of the web page.

In other examples the content insertion element comprises a reusable software component defined in a programming language independent manner. For example a Java (trade mark) applet or ActiveX® control. For example, where the second content source is a desktop search engine the reusable software component may be arranged to pull the desktop search results and insert them into the web page with the first content source results.

The first content source returns the first search results and the content insertion element 520 to the web browser 500. The web browser receives 522 the first search results and content insertion element and begins to render a results page. In so doing it finds the content insertion element and sends 524 the query and optional parameters to the second content source identified in the content insertion element. The second content source 504 receives the query and retrieves 526 second search results from itself. The search results are retrieved in any suitable manner, optionally using parameters received in the content insertion element. For example, the parameters may include user data about the geographical location of the user or other demographic information. Note that since the query comes from the user's browser, the second content source 504 also has access to browser attributes of the user's browser. For example, geographical location, browser type and other attributes. The second content source retrieves a ranked list of search results optionally with a probability of click associated with each search result. The probability of click is a likelihood that a search result will be clicked or selected by a user when presented at the web browser 500 together with one or more of the other search results in a ranked list.

The second content source may send 528 only a subset of the second search results to the web page. For example, the second content source may select those second search results which have a probability of click over a threshold and/or using optional parameters.

The first content source may specify more than one insert point within its results page. Instructions associated with the content insertion element (such as a script) which execute when the second content source results are made available to the web browser are then able to select which one or more of the insert points to use for inserting the second search results into the web page. In this way the position for the content insertion element relative to the first search engine results may be controlled according to features of the web page or web browser.

The web browser 500 renders 530 a results page with the first search results and the content insertion element comprising the selected second search results. The rendered page has the appearance of a results page of the first content source which may be familiar to the user. The content insertion element may be depicted as a shaded region on the rendered page to indicate to the user that its contents are from another source; however this is not essential. Any type of indication may be used such as color, boarders, font type and the like. The size of the display space for the second content results is controlled to fit the returned second content results either implicitly or by explicit script control running in the browser. The web browser 500 may optionally de-duplicate the search results using instructions provided at the web browser for doing this.

The methods described with reference to FIG. 5 may be extended for additional content sources and content insertion elements. For example, more than one content insertion element may be generated each specifying the same second content source. This may be useful where query modification is used. For example, the content insertion elements may comprise different queries as a result of query modification at the first content source.

In other examples, more than one content insertion element is generated and these specify different content sources. In this way the same query may be issued to a plurality of different content sources and the results combined in a single results page. Query modification may or may not be used.

It is also possible to use a single content insertion element which points to more than one additional content source. In some examples complex content insertion elements may be used such as a div containing two iframes or other nested arrangements of content insertion elements. In some examples a single content source may produce two or more content insertion elements (via a script running in the browser where the script is provided by the content source).

Figure 6:
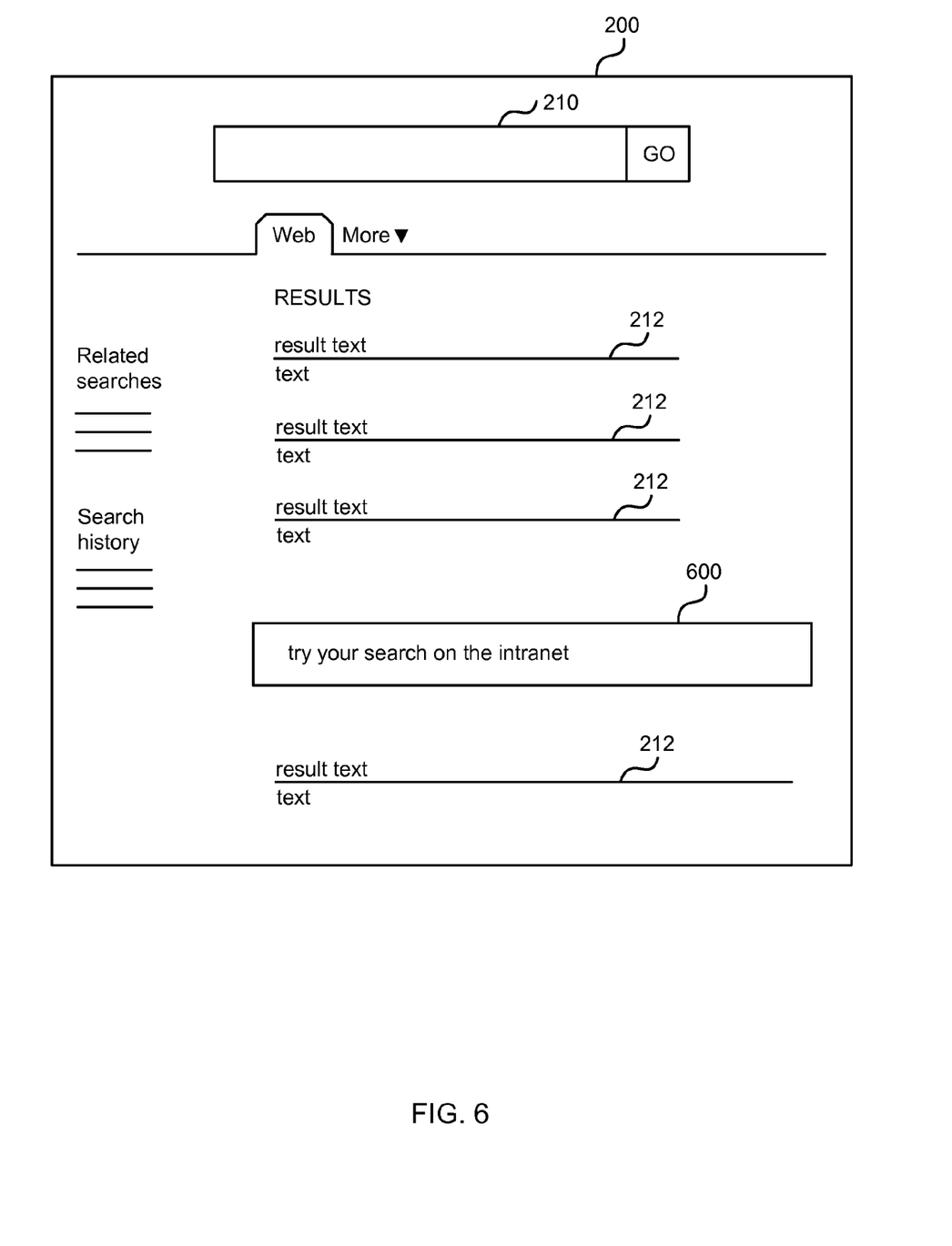
FIG. 6 is a schematic diagram of a web browser for displaying combined search results

FIG. 6 is a schematic diagram of a web page rendered by a web browser such as web browser 500 of FIG. 5. The web page is similar to that of FIG. 2 and the same reference numerals are used to represent the same components. In this example a content insertion element 600 contains text prompting a user to try their search on the intranet. This prompt may be provided in addition to one or more second search results where the second content source is an intranet content source. When a user selects one of the search results in the content insertion element 600 the web browser is directed to the intranet content source. In another example, the prompt acts to direct the user to "find more on the intranet" and appears with injected results from the second content source.

Figure 7:
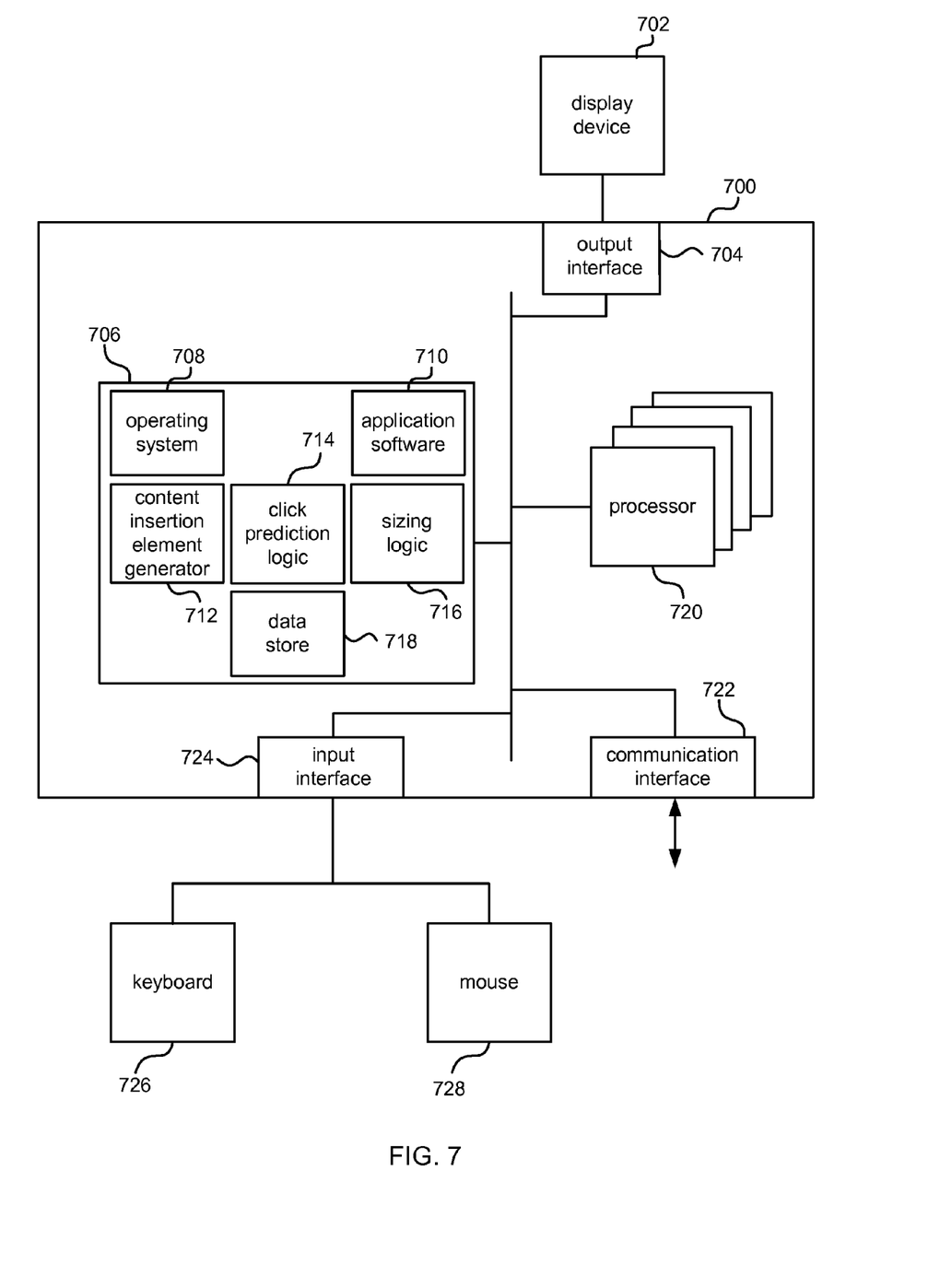
FIG. 7 illustrates an exemplary computing-based device in which embodiments of a system for combining search results may be implemented.

FIG. 7 illustrates various components of an exemplary computing device 700 which may be implemented as any form of a computing and/or electronic device, and in which embodiments of a entity which is part of a system for combining search results from different sources may be implemented. For example, the computing device may be a content source such as first or second content source as described above.

The computing device 700 comprises input interface 724 which is of any suitable type for receiving media content, Internet Protocol (IP) input, search queries, web-based input or other input. The input interface 724 may receive input from user input devices such as a keyboard 726 and mouse 728 although this is not essential. Other user input devices may be used such as touch screens and gesture-based input devices. The device also comprises communication interface 722 to enable it to communicate with other entities over a communications network. For example, with web browsers at user devices.

Computing device 700 also comprises one or more processors 720 which may be microprocessors, controllers or any other suitable type of processors for processing computer executable instructions to control the operation of the device in order to provide at least part of a system for combining search results from different content sources as described herein. In some examples, for example where a system on a chip architecture is used, the processors 720 may include one or more fixed function blocks (also referred to as accelerators) which implement a part of the methods described herein in hardware (rather than software or firmware). Platform software comprising an operating system 708 or any other suitable platform software may be provided at the computing device to enable application software 710 to be executed on the device.

The computer executable instructions may be provided using any computer-readable media that is accessible by computing based device 700. Computer-readable media may include, for example, computer storage media such as memory 706 and communications media. Computer storage media, such as memory 706, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 706) is shown within the computing device 700 it will be appreciated that the storage may be distributed or located remotely and accessed via a network or other communication link (e.g. using communication interface 722).

An output interface 704 is also provided such as an audio and/or video output to a display device 702 integral with or in communication with the computing device. The display device 702 may provide a graphical user interface, or other user interface of any suitable type although this is not essential. The display device may provide a graphical user interface. In an embodiment the display device 702 may also act as a user input device if it is a touch sensitive display device. The output interface 704 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of combining search results from a plurality of search engines comprising:
   at a first search engine:
      receiving a search query from a web browser associated with an identifier;
      generating a content insertion element, when the identifier meets an access criterion, the content insertion element configured to be executed by the web browser and holding at least the search query and an address of a second search engine;
      retrieving first search engine search results using the search query;
      sending the first search engine search results and the content insertion element to the web browser such that, in response, the web browser:
         executes the content insertion element to send the search query, using the held address, to the second search engine to obtain second search engine search results, and
         renders a results page comprising at least some of the first search engine search results and the second search engine search results, wherein the sending the first search engine search results including specifying a plurality of insertion points within the first search engine search results and sending instructions associated with the content insertion element, the instructions, when executed, causing different portions of the second search engine results to be inserted into different positions associated with the plurality of insertion points.

2. The method as claimed in claim 1, further comprising generating a plurality of content insertion elements, when the identifier meets the access criterion, each content insertion element holding at least the search query and an address of a search engine, the search engine being the second search engine or another search engine.

3. The method as claimed in claim 2, further comprising sending all of the plurality of content insertion elements to the web browser.

4. The method as claimed in claim 2, further comprising generating the plurality of content insertion elements such that the search query held by at least some of the plurality of content insertion elements is modified.

5. The method as claimed in claim 1 wherein the content insertion element is selected from at least one of: a hyper text mark up language (HTML) element, multi-media platform instructions, or rich internet application framework instructions.

6. The method as claimed in claim 1, wherein the first search engine is an Internet search engine and the second search engine is an intranet search engine.

7. The method as claimed in claim 1, wherein the second search engine is a desktop search engine associated with a client machine comprising the web browser and wherein the generating the content insertion element comprises forming a browser hosted software component defined in a programming language independent manner.

8. The method as claimed in claim 1, further comprising checking whether the identifier meets the access criterion by using a look up table that comprises ranges of identifiers which meet the access criterion.

9. The method as claimed in claim 1, wherein the content insertion element comprises one or more further content insertion elements.

10. A computer-implemented method of combining search results from a plurality of search engines comprising:
    at a first search engine:
       receiving a search query from a web browser associated with an identifier;
       generating a plurality of content insertion elements, when the identifier meets an access criterion, each content insertion element configured to be executed by the web browser and holding at least the search query and an address of another search engine such that the plurality of content insertion elements hold the search query and addresses of a plurality of other search engines;
       retrieving first search engine search results using the search query;
       sending the first search engine search results and the plurality of content insertion elements to the web browser such that, in response, the web browser:
          executes the plurality of content insertion elements to send the search query, using the corresponding held addresses, to the plurality of other search engines to obtain results from the plurality of other search engines and
          renders a results page comprising at least some of the first search engine search results and the results from the plurality of other search engines, wherein the sending the first search engine search results including specifying a plurality of insertion points within the first search engine search results and sending instructions associated with a first content insertion element of the plurality of content insertion elements, the instructions, when executed, causing different portions of a first result of the results from the plurality of other search engine results, the first result being associated with the first content insertion element, to be inserted into different locations associated with of the plurality of insertion points.

11. The method as claimed in claim 10, further comprising using nested content insertion elements.

12. The method as claimed in claim 10, further comprising checking whether the identifier meets the access criterion by using a look up table that comprises ranges of identifiers which meet the access criterion.

13. The method as claimed in claim 10, wherein the first search engine is an Internet search engine and the plurality of other search engines are intranet search engines.

14. A computer-implemented method of combining search results from a plurality of search engines comprising:
    at a first search engine which is an Internet search engine:
       receiving a search query from a web browser associated with an identifier, the web browser being provided at a client device located in an intranet connected to the Internet by at least one firewall;
       generating a content insertion element, when the identifier meets an access criterion, the content insertion element configured to be executed by the web browser and holding at least the search query and an address of a second search engine located in the intranet;
       retrieving first search engine search results using the search query;
       sending the first search engine search results and the content insertion element to the web browser such that, in response, the web browser:
          executes the content insertion element to send the search query, using the held address, to the second search engine to obtain second search engine search results, and renders a results page comprising at least some of the first search engine search results and the second search engine search results, wherein the sending the first search engine search results including specifying a plurality of insertion points within the first search engine search results and sending instructions associated with the content insertion element, the instructions, when executed, causing different portions of the second search engine results to be inserted into different locations associated with the plurality of insertion points.

15. The method as claimed in claim 14, further comprising:
generating a plurality of content insertion elements, when the identifier meets the access criterion, each content insertion element holding at least the search query and an address of a search engine, such that the plurality of content insertion elements hold the search query and addresses of a plurality of other search engines; and
sending all the content insertion elements to the web browser.

16. The method as claimed in claim 15, further comprising generating the plurality of content insertion elements such that the search query held by at least some of the plurality of content insertion elements is modified.

17. The method as claimed in claim 14, wherein the content insertion element is selected from at least one of: a hyper text mark up language (HTML) element, multi-media platform instructions, or rich internet application framework instructions.

18. The method as claimed in claim 14, wherein the second search engine is a desktop search engine of the client device and wherein the generating the content insertion element further comprises forming a browser hosted reusable software component defined in a programming language independent manner.

19. The method as claimed in claim 14, further comprising checking whether the identifier meets the access criterion by using a look up table that comprises ranges of identifiers which are addresses of client devices in the intranet.

20. The method as claimed in claim 14, wherein the generating the content insertion element further comprises generating a first content insertion element which holds one or more further content insertion elements.

* * * * *